Oct. 16, 1923.
G. E. GAREY
BEARING BURNING-IN ATTACHMENT
Filed May 2, 1922
1,470,722
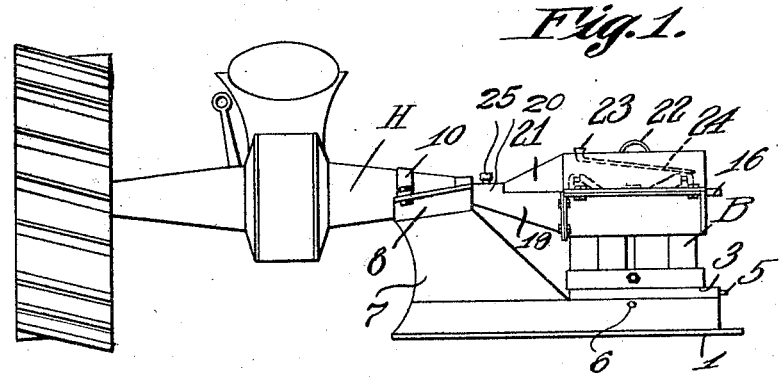
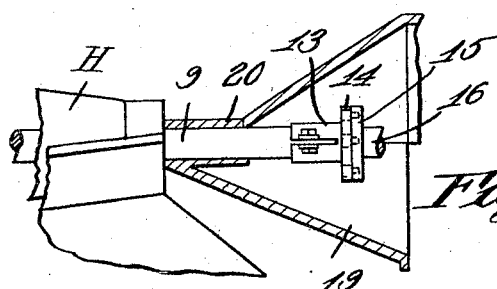 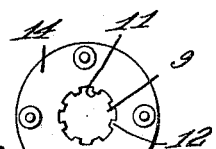
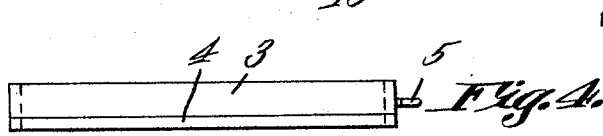
 
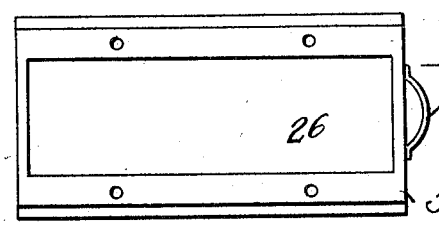 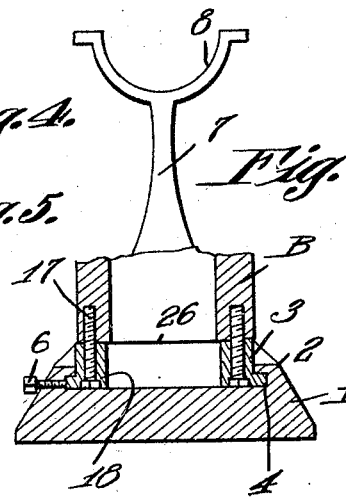
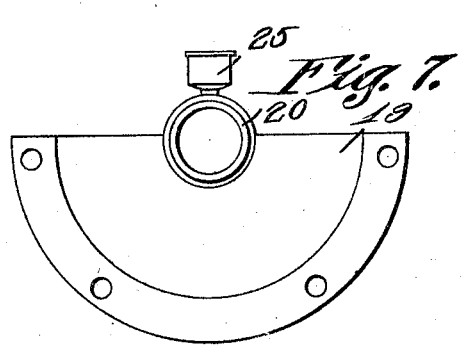
G. E. Garey, Inventor
By C. A. Snow & Co., Attorney Patented Oct. 16, 1923.

1,470,722

UNITED STATES PATENT OFFICE.

GEORGE E. GAREY, OF DOWNS, KANSAS.

BEARING BURNING-IN ATTACHMENT.

Application filed May 2, 1922. Serial No. 558,037.

*To all whom it may concern:*

Be it known that I, GEORGE E. GAREY, a citizen of the United States, residing at Downs, in the county of Osborne and State of Kansas, have invented a new and useful Bearing Burning-In Attachment, of which the following is a specification.

This invention relates to an attachment adapted to be applied to and operated by the rotatable axle of a motor vehicle whereby the bearings of a motor can be burned-in.

Heretofore it has been the general practice to scrape the bearings and it has been impossible to obtain an even or uniformly smooth surface. Furthermore the old method of scraping bearings has been long and tedious as well as expensive.

It is an object of the present invention to provide a means for burning-in the bearings, this means being adapted to be coupled to the drive axle of a motor vehicle so that an efficient bearing surface can be quickly obtained instead of the expensive and inefficient surface that has been obtained heretofore by the hand process.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is an elevation showing the attachment applied to the drive axle of a tractor, an engine block being shown in position for the burning-in of the bearings.

Figure 2 is an enlarged section through a portion of the attachment and showing the means employed for coupling the drive axle of the tractor to the shaft of the engine.

Figure 3 is an end elevation of the coupling.

Figure 4 is a side elevation of the adjustable slide for supporting the engine block.

Figure 5 is a plan view of the slide.

Figure 6 is a transverse section through the attachment and showing a portion of a block secured thereon.

Figure 7 is an end elevation of a portion of the attachment adapted to be secured to the block of the engine.

Referring to the figures by characters of reference 1 designates a base having parallel undercut ribs 2 on the top face thereof forming a channel in which is slidably mounted a member 3. This member or slide has ribs 4 at the sides thereof engaging the ribs 2 as shown in Figure 6. Suitable means, such as a handle 5, may be extended from one end of the slide 3 to facilitate the adjustment of the slide on the base. A set screw 6 can be used for fastening the slide against movement.

A standard 7 extends from one end of the base and is provided at its upper end with a seat 8 adapted to receive and support one end of the housing H of the drive axle 9 of a tractor or other motor vehicle. This housing can be secured to the seat 8 by means of straps 10 extending over the housing and bolted to the seat.

The end of the axle 9 is formed with longitudinal grooves 11 and these grooves are designed to receive ribs 12 formed longitudinally within a coupling sleeve 13 mounted on the end of the axle 9. An annular flange 14 is formed on the sleeve and is adapted to be bolted or otherwise secured to a collar 15 on the end of the engine shaft 16.

The block of the engine has been indicated at B and is secured on the slide 3 in any preferred manner, as by means of bolts 17 extending through the slide and having their heads seated in counter-sinks 18. Detachably secured to one end of the engine block B is a tapered extension 19 provided at its small end with a bearing 20 in which the shaft 9 is adapted to rotate. This extension is provided with a cover 21 which also extends over the inverted block B so as to completely house the shaft 16. The cover may be provided with a handle 22 to facilitate the removal thereof and lubricating means such as a funnel 23 having a delivery tube 24 can be mounted in the cover for lubricating the engine during the burning-in of the bearings. The bearing 20 can also be provided with an oil cup 25 as shown particularly in Figure 7.

It will be apparent from the foregoing that the rear axle of a motor vehicle can be coupled readily to the shaft of an engine, the engine block being held fixed relative to the axle so that there will be no vibration during the operation of burning-in the bearing. Necessary adjustments can be obtained by shifting the slide 3 and if the engine block to be operated on is of a different size than that previously mounted on the attachment a higher or lower slide can be used to insure proper alignment of the shaft and axle. By employing power means such as described the burning-in of an axle can be effected within a comparatively short time and the surface obtained will be accurate and of the highest efficiency. By cutting away the middle portion of the slide 3 as shown at 26 in the drawings ample space is provided for the valves and pistons when the inverted block is mounted on the slide.

What is claimed is:

1. The combination with a base, and a seat supported thereby for engaging and holding the housing of the drive axle of a motor vehicle, of a slide adjustably mounted on the base for supporting an engine block, a member for attachment to a supported engine block, said member having a bearing for the axle of the motor vehicle, and means for coupling said axle to the engine shaft.

2. The combination with a base having a seat at one end for engaging and supporting the housing of the drive axle of a motor vehicle, and means for fastening said housing to the seat, of a slide adjustably mounted on the base, means for securing an engine block thereto, a member for attachment to the engine block, said member having a bearing for the axle of the motor vehicle, means for coupling said axle to the engine shaft, and a covering mounted on said member and adapted to house the engine shaft.

3. The combination with a base, a standard thereon, a seat on the standard, and means for fastening to the seat one end of the housing of the drive axle of a motor vehicle, of a slide adjustably mounted on the base, means for fastening the slide in adjusted position, means for securing an inverted engine block to the slide, said slide being cut away to receive the valves and pistons on the engine block, a member for attachment to one end of the block and having a bearing for the axle, and means for coupling said axle to the shaft of the engine.

In testimony that I claim the foregoing as my own, I have hereto affixed my signature in the presence of two witnesses.

GEORGE E. GAREY.

Witnesses:
C. L. CUSHING,
MERLE CUSHING.